United States Patent
Kirchen (10) Patent No.: US 8,834,087 B2
(45) Date of Patent: Sep. 16, 2014

(54) FASTENER CLIP ASSEMBLY

(75) Inventor: James T. Kirchen, Glenview, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 13/825,504

(22) PCT Filed: Oct. 25, 2011

(86) PCT No.: PCT/US2011/057683
§ 371 (c)(1),
(2), (4) Date: Mar. 21, 2013

(87) PCT Pub. No.: WO2012/058215
PCT Pub. Date: May 3, 2012

(65) Prior Publication Data
US 2013/0199004 A1 Aug. 8, 2013

Related U.S. Application Data (60) Provisional application No. 61/408,314, filed on Oct. 29, 2010.

(51) Int. Cl.
*F16B 19/00* (2006.01)
*F16B 13/02* (2006.01)
*F16B 21/08* (2006.01)

(52) U.S. Cl.
CPC .............. *F16B 13/02* (2013.01); *F16B 21/086* (2013.01)
USPC .................... 411/508; 411/347; 411/509

(58) Field of Classification Search
USPC .............. 411/32–33, 347, 448, 449, 508, 509, 411/510
See application file for complete search history.

(56) References Cited

U.S. PATENT DOCUMENTS

| | | | | |
|---|---|---|---|---|
| 3,577,603 A | * | 5/1971 | Seckerson et al. | 411/510 |
| 3,860,999 A | * | 1/1975 | Meyer | 411/510 |
| 4,122,583 A | * | 10/1978 | Grittner et al. | 24/703.1 |
| 4,715,095 A | * | 12/1987 | Takahashi | 24/453 |
| 4,778,320 A | * | 10/1988 | Nakama | 411/509 |
| 4,810,147 A | * | 3/1989 | Hirohata | 411/349 |
| 5,173,026 A | * | 12/1992 | Cordola et al. | 411/508 |
| 5,301,396 A | | 4/1994 | Benoit | |
| 5,319,839 A | * | 6/1994 | Shimajiri | 24/453 |
| 5,573,362 A | * | 11/1996 | Asami et al. | 411/509 |
| 5,689,863 A | * | 11/1997 | Sinozaki | 24/297 |
| 5,704,753 A | * | 1/1998 | Ueno | 411/509 |

(Continued)

FOREIGN PATENT DOCUMENTS

ES 2127062 A1 4/1999

OTHER PUBLICATIONS

International Search Report and Written Opinion corresponding to PCT/US2011/057683, dated Jan. 19, 2012.

*Primary Examiner* — Roberta Delisle
(74) *Attorney, Agent, or Firm* — Mark W. Croll; Paul F. Donovan (57) ABSTRACT

A push-in fastener clip assembly includes a fastener having deflectable legs and compression ring for sliding along the deflectable legs during installation, with the compression ring connected to the fastener by frangible connections that are broken as the fastener clip assembly is being installed. Slots in the fastener guide the broken frangible connections during installation of the fastener, limiting rotation of the compression ring.

20 Claims, 6 Drawing Sheets

(56) References Cited

U.S. PATENT DOCUMENTS

| | | | |
|---|---|---|---|
| 6,305,055 B1 * | 10/2001 | Castro | 24/458 |
| 6,572,317 B2 * | 6/2003 | Okada et al. | 411/508 |
| 6,974,292 B2 * | 12/2005 | Hansen | 411/508 |
| 7,328,489 B2 * | 2/2008 | Leverger et al. | 24/453 |
| 7,481,474 B2 * | 1/2009 | Higgins et al. | 296/1.08 |
| 7,549,829 B2 * | 6/2009 | Okada et al. | 411/508 |
| 7,549,830 B2 * | 6/2009 | Cooley et al. | 411/508 |
| 8,613,128 B2 | 12/2013 | Moerke et al. | |

* cited by examiner

FASTENER CLIP ASSEMBLY

RELATED APPLICATIONS

The present application is National Phase of International Application No. PCT/US2011/057683, filed Oct. 25, 2011, and claims priority from U.S. Application No.61/408,314, filed Oct. 29, 2010.

FIELD OF THE INVENTION

The present invention relates generally to fasteners, and more specifically to push-in fasteners used for attaching one component to another component, such as, for example, panels to panels, other items and things to panels and the like, by inserting the fastener through apertures in the components to be held together, with the fastener having resilient retaining members that bend inwardly during insertion through the components to be fastened, and that expand or rebound outwardly when inserted fully through the final component. A fastener of this type is sometimes referred to as a fastener clip

BACKGROUND OF THE INVENTION

Different types of push-in fasteners are known for use in different environments and for different purposes. A known feature of push-in fasteners is a resiliently bendable or deflectable retention member that bends inwardly when the fastener is inserted into an opening and rebounds outwardly to hold the fastener when the fastener is fully inserted. Inward bending of the retention member can be caused by the sliding engagement of the member against the aperture surface in the component. Fastener clips using two or more such retention members are known.

U.S. Pat. No. 5,301,396 discloses a fastener clip assembly with a compression member. The fastener clip assembly includes a fastener having a shank with a head at one end of the shank, with the shank comprising a plurality of resilient legs integrally formed with the head and mutually connected opposite the head at a distal end of the fastener. The legs are bowed outwardly to define a maximum diameter larger than an aperture size in a panel or component through which the fastener is inserted. During installation of the fastener, the legs deflect inwardly so as to pass through the aperture and then rebound outwardly as the maximum diameter portion passes through the aperture. The fastener clip assembly further includes a compression ring having a central tapered aperture with a diameter slightly less than the diameter of the aperture in the panel or component through which the fastener is inserted. When used as a part of the fastener clip assembly, the ring rests against the panel or component through which the fastener is inserted as the fastener is inserted. The ring provides contact against the legs, compressing the legs for passing through both the ring and the panel or component. The slightly smaller diameter of the aperture in the ring holds the legs away from contact with the edge of the aperture. Accordingly, the ring is useful in reducing drag or abrasion that may occur if the aperture of the panel or component is harsh or abrasive to the material of the fastener. The ring and fastener can be made of materials and shaped in a manner so as to slide easily against each other, thereby reducing insertion force required when compared to the force required if the legs were to slide directly against the aperture of the panel or component in which the fastener is used.

The aforedescribed fastener clip assembly has been used effectively to reduce insertion force even with fasteners that provide high retention by having a relatively high extraction force requirement to remove the fastener. If a seal against fluid infiltration is required, a separate, discrete sealing ring is added to the fastener assembly. This additional step can be time consuming and costly.

An occasional problem of known fastener assemblies is that, although the compression ring can be cast together with the fastener, the compression ring is molded at the end or tip of the fastener and must be separated from the fastener and properly positioned on the fastener prior to actual use. The separated compression ring is placed in a so-called "pre-drive" position on the fastener. Although the fastener and compression ring are designed for the compression ring to be held on the fastener in the pre-drive position, during subsequent handling it can happen that the compression ring becomes separated from the fastener. In a large container of fastener assemblies, a dislodged compression ring can be difficult to locate. Locating and repositioning the compression ring on a fastener can be time consuming.

SUMMARY OF THE INVENTION

The present fastener clip assembly combines plastic clip technology with low force compression ring technology into a better performing, more robust design than currently available. Improved sealing against water infiltration, without the use of independent foam sealing rings, is also provided. The push-in fastener clip assembly includes a fastener with deflectable legs and a compression ring for sliding along the deflectable legs to compress the legs as the fastener assembly is being installed for use. The fastener and compression ring are molded as a monolithic body, with the compression ring connected to the fastener in a ready-to-install position by frangible connections that are broken as the fastener clip assembly is installed. Slots can be provided in the fastener for guiding the broken frangible connections during installation of the fastener.

The compression ring can be formed so as to provide a sealing function after installation, either alone or with an overmolded or otherwise attached sealing body.

With the fastener assembly manufactured in a ready-to-install condition no pre-installation steps are required to ready the fastener for installation. With the compression ring physically attached to the fastener, the potential for a compression ring to be separated from the fastener prior to installation is reduced. Preparation and installation are facilitated.

Other features and advantages of the invention will become apparent to those skilled in the art upon review of the following detailed description, claims and drawings in which like numerals are used to designate like features.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Figure 1:
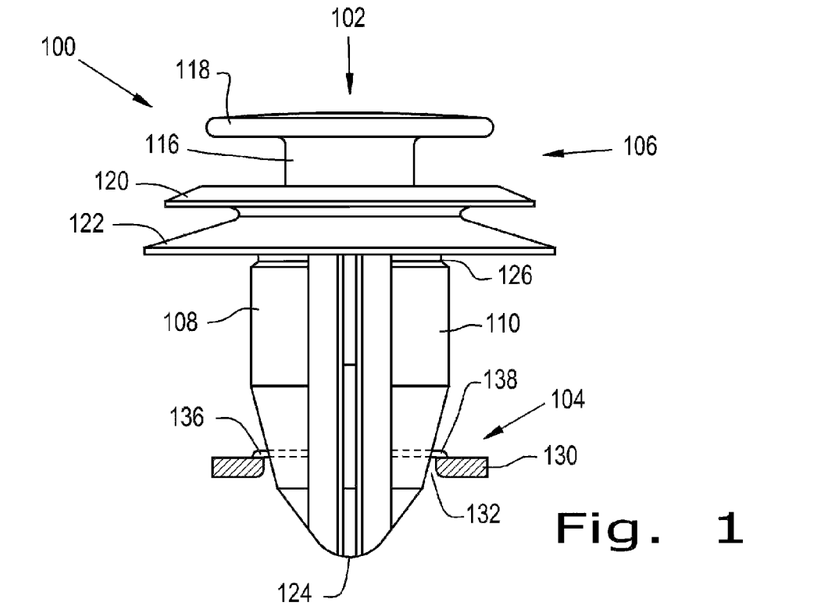
FIG. 1 is an elevational view of a fastener clip assembly, in partial cross-section.
Figure 2:
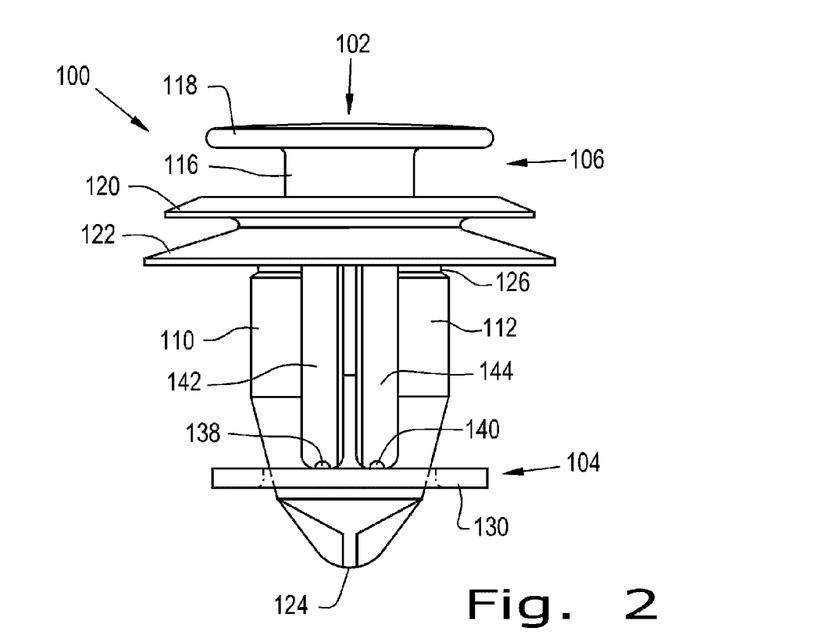
FIG. 2 is an elevational view of the fastener clip assembly rotated 90° from the view shown in FIG. 1.
Figure 3:
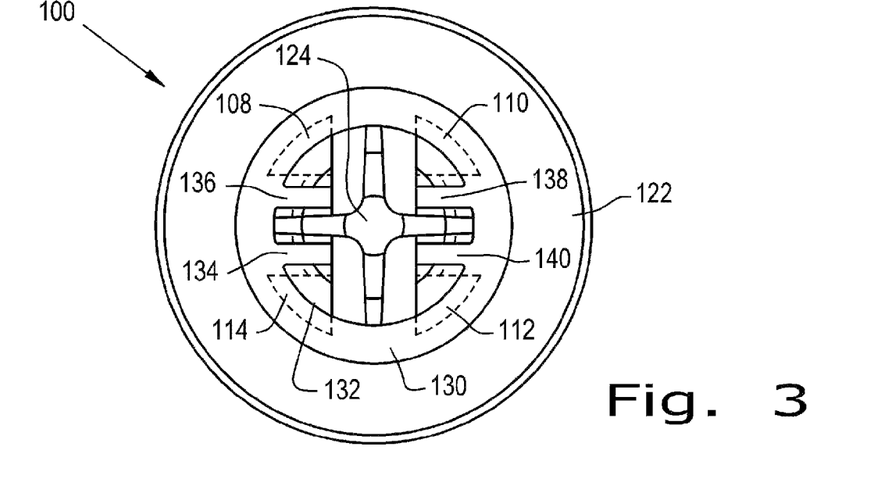
FIG. 3 is an end view of the fastener clip assembly shown in FIG. 1 and FIG. 2.

Referring now more particularly to the drawings, FIGS. 1, 2 & 3 show a fastener clip assembly 100 including a fastener 102 and a compression ring or washer 104. Fastener 100 can be provided as a monolithic body of molded plastic including fastener 102 and compression ring or washer 104 of the same material. Accordingly, no preassembly of compression ring or washer 104 on fastener 102 is required as the fastener and washer are manufactured in a condition that is ready for installation.

Fastener 102 includes a head 106 and four resiliently deflectable legs 108, 110, 112 and 114 connected to head 106. Head 106 has a center post 116, a cap 118 at the outer end of center post 116 and a flange 120 projecting radially from center post 116 in spaced relation to cap 118. An umbrella or skirt 122 is provided also extending radially from center post 116 adjacent flange 120 on the side of flange 120 opposite from cap 118.

Resiliently deflectable legs 108, 110, 112, 114 are each connected to head 106 and extend therefrom in generally discrete and separate lengths to the distal ends thereof at which they are joined at a tip 124. Proximal portions of resiliently deflectable legs 108, 110, 112, 114 relative to head 106 are substantially axially oriented to near the midpoint of the lengths thereof. More distal portions of resiliently deflectable legs 108, 110, 112, 114 are more significantly tapered or inwardly angled toward tip 124. Accordingly, fastener 102 presents a relatively narrow, pointed end at tip 124 and portions of resiliently deflectable legs 108, 110, 112, 114 immediately adjacent to tip 124 so that fastener clip assembly 100 can be started easily in a hole or aperture receiving it. At proximal ends thereof, resiliently deflectable legs 108, 110, 112, 114 define a channel 126 beneath umbrella or skirt 122. The diameter of resiliently deflectable legs 108, 110, 112, 114 at channel 126 is less than the diameter immediately adjacent thereto, and accommodates compression ring or washer 104 as will be described.

Compression ring or washer 104 in the exemplary embodiment shown in FIGS. 1-3 has a generally annular, flat body 130 with a central aperture 132. As described previously, fastener clip assembly 100 can be molded as a monolithic body in which compression ring or washer 104 is connected to fastener 102 at four connection points by four frangible connections 134, 136, 138, 140. Compression ring or washer 104 is thereby held in proper position for the fastener to be installed, remaining securely connected to fastener 102 by frangible connections 134, 136, 138, 140 until the fastener is first pushed into a panel or other object, the compression ring engages the panel or object, and the compression ring is separated by rupturing frangible connections 134, 136, 138, 140. As the installation of fastener 102 into a hole or aperture is completed, resiliently deflectable legs 108, 110, 112, 114 slide through aperture 132 until the fastener is fully inserted. Resiliently deflectable legs 108, 110, 112, 114 are deflected inwardly by sliding movement against the surface defining aperture 132, until compression ring or washer 104 reaches its installed position beneath umbrella 116 where the compression ring or washer settles into channel 126. Legs 108, 110, 112, 114 then rebound outwardly in known fashion to hold fastener 102 in its installed position.

The exemplary embodiment shown includes four resiliently deflectable legs 108, 110, 112, 114; however, it should be understood that more or fewer deflectable components of the fastener can be used. Using four resiliently deflectable legs 108, 110, 112, 114 provides four distinct engagement points in a panel or body in which fastener clip assembly 100 is installed, for a well-balanced attachment. Using four resiliently deflectable legs 108, 110, 112, 114 also provides well-balanced and closely spaced engagements with compression ring or washer 104, and minimizes distortion of compression ring or washer 104 as relative sliding movement proceeds between resiliently deflectable legs 108, 110, 112, 114 and compression ring or washer 104. Further, it should be understood that the shapes and configurations of the deflectable components can differ from that shown and described for resiliently deflectable legs 108, 110, 112, 114. For example and not limitation, it is known in some push in fasteners to use deflectable components or legs that narrow in diameter both above and below an area of largest circumference. So also, more or fewer frangible connections can be used than the four frangible connections 134, 136, 138, 140 shown and described herein.

Further, while the particular configuration for fastener clip assembly 100 shown and described herein is suitable for some purposes and uses, it should be understood that the present invention can be utilized with a wide variety of designs and configurations. For example, the exposed end of the fastener can be configured for various purposes and uses such as to anchor or attach to other components and things, or configured in various ways for connection to other devices. The particular purpose and use for which the fastener is configured can vary for many different applications while still taking advantage of having an integrally connected compression ring that is separable at frangible connections.

Through slots 142, 144 can be provided between pairs of legs on opposite sides, and frangible connections 134, 136, 138, 140 can be configured to fracture with segments thereof remaining on and extending inwardly from body 130. The fragments of the broken frangible connections 134, 136, 138, 140 can be guided along slots 142, 144 as compression ring 104 moves to its installed position. Accordingly, the remaining segments of broken frangible connections 134, 136, 138, 140 moving along through slots 142, 144 inhibit rotation of compression ring 104 relative to fastener 102.

Figure 4:
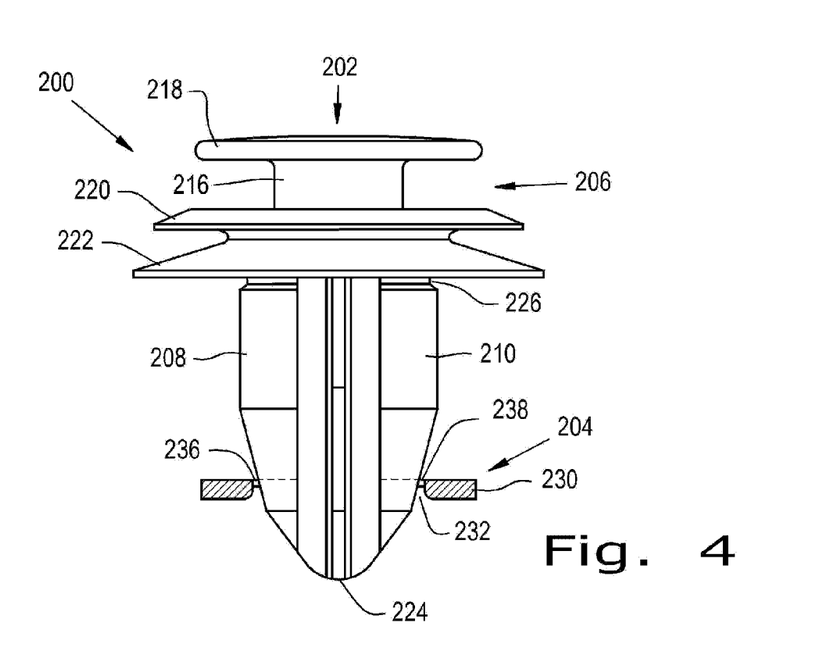
FIG. 4 is an elevational view of another embodiment of a fastener clip assembly, in partial cross-section.
Figure 5:
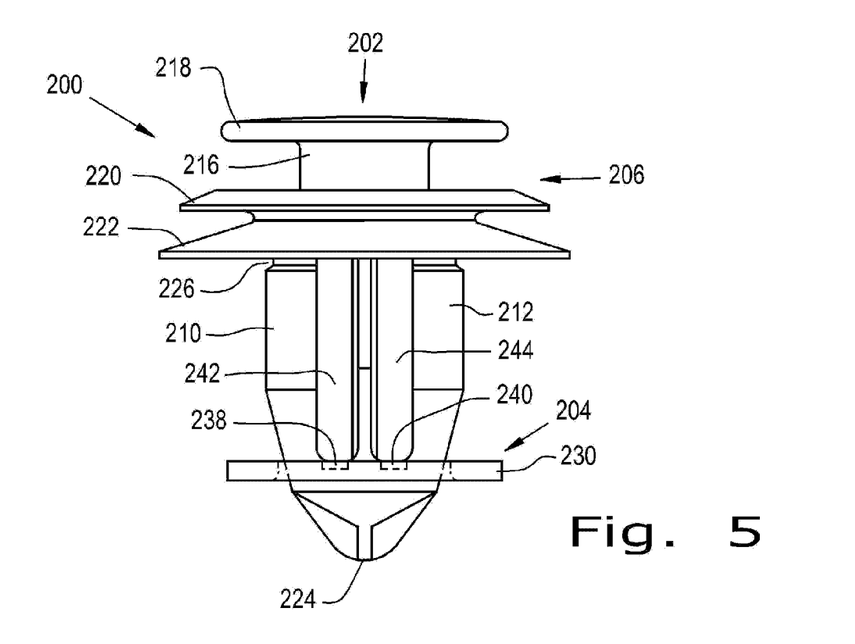
FIG. 5 is an elevational view of the fastener clip assembly shown in FIG. 4 rotated 90° from the view shown in FIG. 4.
Figure 6:
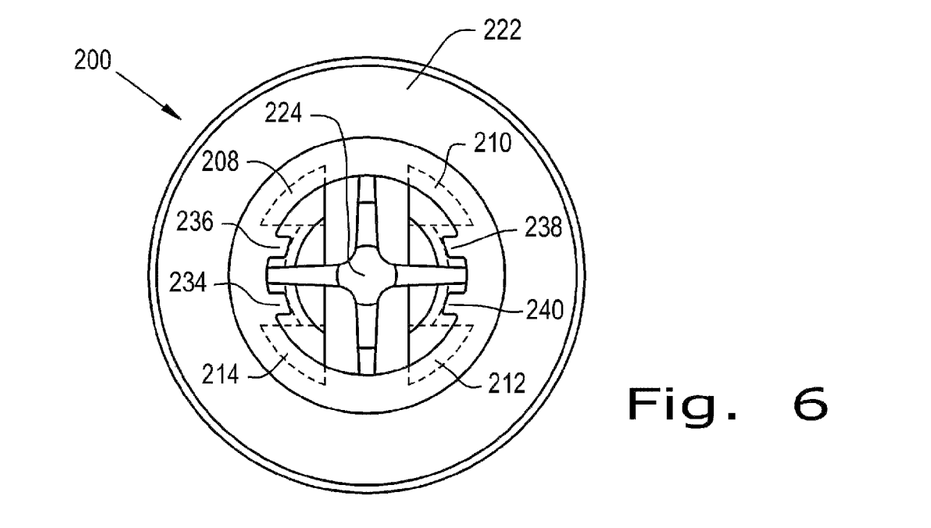
FIG. 6 is an end view of the fastener clip assembly shown in FIG. 4 and FIG. 5.

FIGS. 4, 5 and 6 illustrate a fastener clip assembly 200 similar to fastener clip assembly 100. Accordingly, fastener clip assembly 200 includes a fastener 202 and a compression ring or washer 204 generally similar to fastener 102 and compression ring or washer 104 as described with respect to fastener clip assembly 100. Fastener 202 includes a head 206 and resiliently deflectable legs 208, 210, 212, 214. Head 206 includes a center post 216, a cap 218, a flange 220 and an umbrella or skirt 222. Resiliently deflectable legs 208, 210, 212, 214 are shaped similarly to resiliently deflectable legs 108, 110, 112, 114 described previously herein and are joined at a distal tip 224 while defining a channel 226 at the proximal ends thereof, similar to those described with respect to fastener clip assembly 100. Compression ring or washer 204 is a generally annular body 230 having a central aperture 232, both similar to the corresponding structures described for fastener clip assembly 100. Compression ring or washer 204 is connected by frangible connections 234, 236, 238, 240. However, due to the location, frangible connections 234, 236, 238, 240 are shorter in length than frangible connections 134, 136, 138, 140 of fastener clip assembly 100. Through slots 242, 244 can be provided between pairs of legs on opposite sides, and remaining broken segments of frangible connections 234, 236, 238, 240 can be guided along slots 242, 244 as compression ring 204 moves to its installed position. Accordingly, broken segments of frangible connections 234, 236, 238, 240 moving along through slots 242, 244 inhibit rotation of compression ring 204 relative to fastener 202.

Figure 7:
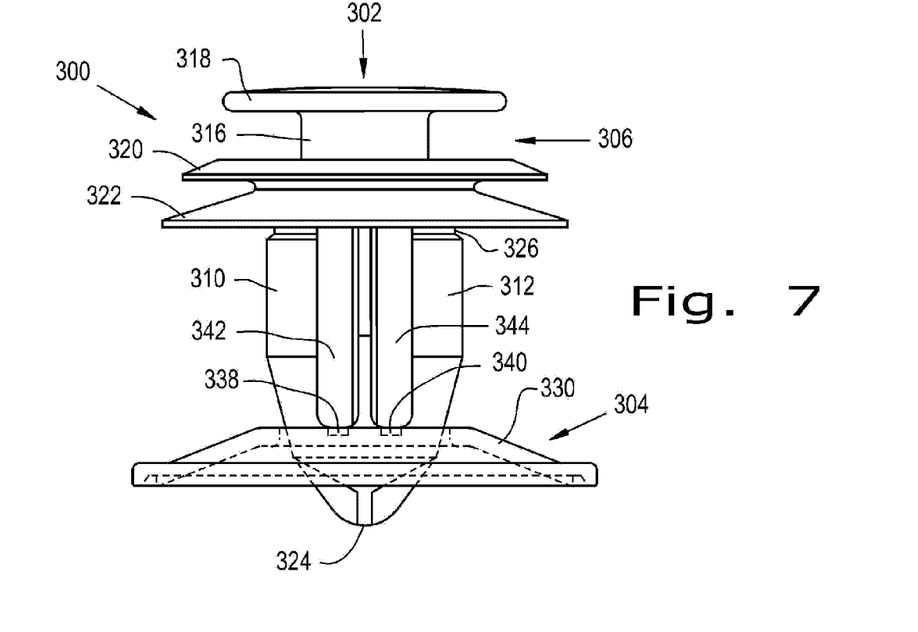
FIG. 7 is an elevational view of still another embodiment of a fastener clip assembly.
Figure 8:
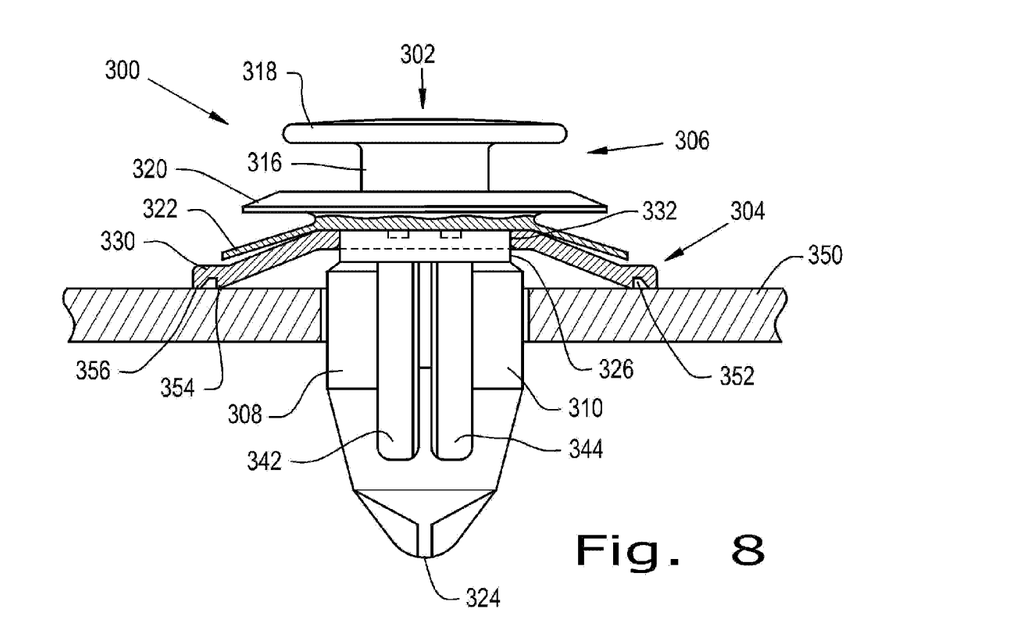
FIG. 8 is a partial cross-sectional view the fastener clip assembly shown in FIG. 7, but depicting the assembly in a condition after installation.
Figure 9:
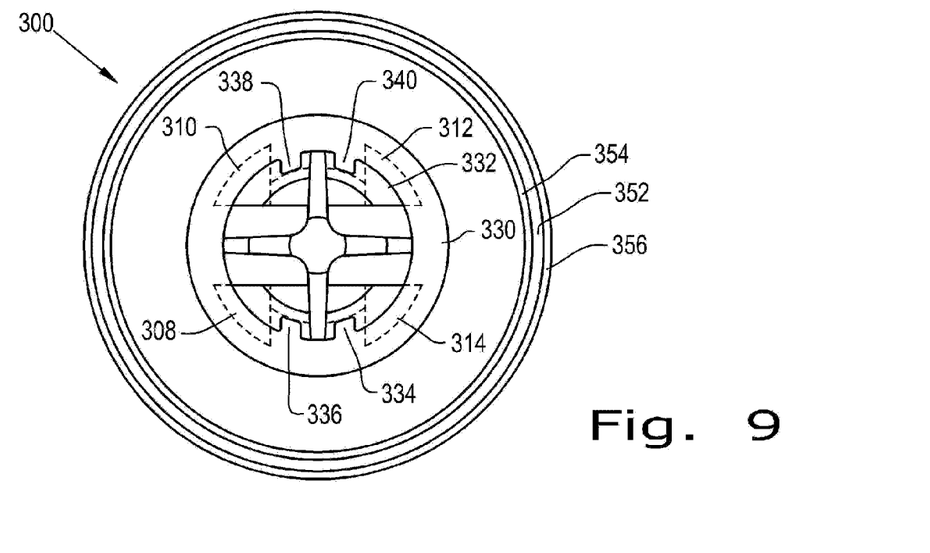
FIG. 9 is an end view of the fastener clip assembly shown in FIG. 7.

FIGS. 7, 8 and 9 illustrate yet another fastener clip assembly 300 including a fastener 302 and a compression ring 304. Components of fastener clip assembly 300 that are similar to corresponding components of fastener clip assemblies 100 and 200 are indicated with reference numerals in the "300" series of numbers similar to those in the "100" and "200" series of numbers described previously, except for differences that are described herein and/or apparent from the drawings. Accordingly, fastener 302 includes a head 306 and resiliently deflectable legs 308, 310, 312, 314. Head 306 includes a center post 316, a cap 318 at the end of center post 316, a flange 320 and an umbrella or skirt 322 extending radially outwardly from center post 316. Resiliently deflectable legs 308, 310, 312, 314 are joined at a distal tip 324 and define a channel 326 at the proximal ends thereof adjacent umbrella or skirt 322. Compression ring or washer 304 is a concave body 330 having an aperture 332. Compression ring or washer 304 is initially connected to fastener 302 by frangible connections 334, 336, 338, 340. Compression ring or washer 304 differs from compression ring or washer 104 and compression ring or washer 204 in that it is larger and generally concave to perform a sealing function against a panel or object in which fastener clip assembly 300 is installed. Through slots 342, 344 can be provided between pairs of legs on opposite sides, and remaining fragments of broken frangible connections 334, 336, 338, 340 can be guided along slots 342, 344 as compression ring 304 moves to its installed position. Accordingly, broken frangible connections 334, 336, 338, 340 moving along through slots 342, 344 inhibit rotation of compression ring 304 relative to fastener 302.

Figure 10:
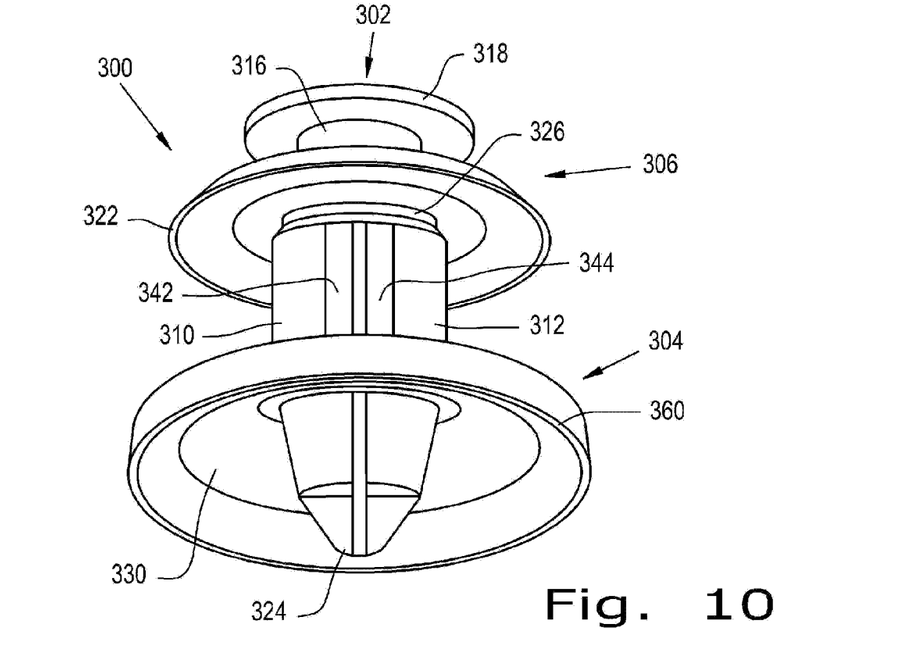
FIG. 10 is a perspective view of a modification to the fastener clip assembly shown in FIGS. 7-9.
Figure 11:
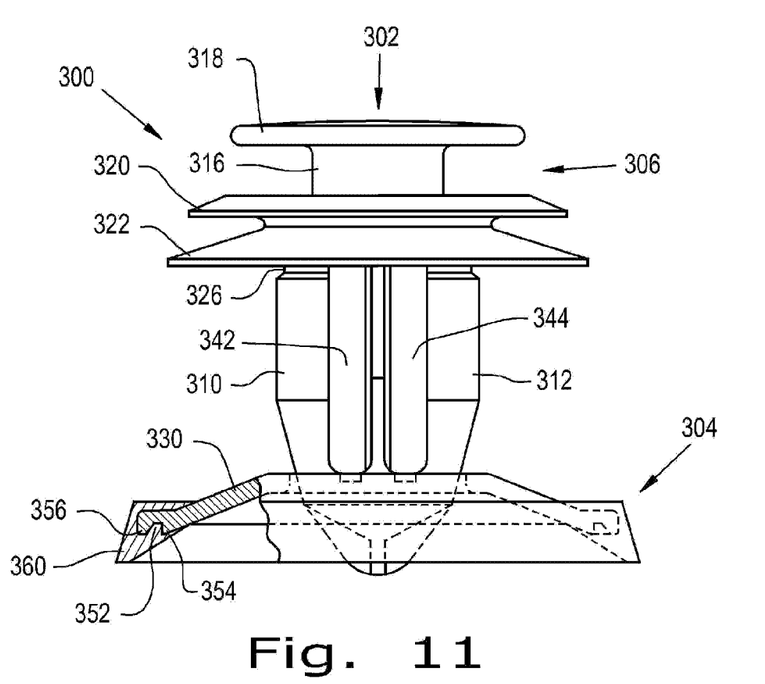
FIG. 11 is a partial cross-sectional view of the fastener clip assembly shown in FIG. 10.

Compression ring or washer 304 can be slightly larger in diameter than the diameter of umbrella or skirt 322 to extend outwardly beyond the umbrella or skirt to engage a panel or object 350 in which fastener clip assembly 300 is installed, as shown in FIG. 8. The peripheral edge of compression ring or washer 304 defines a seal, including an annular channel 352 with inner and outer walls 354, 356 engaging a surface of object 350 in sealing relationship. As shown in FIGS. 10 and 11, an overmolded sealing body 360 can be provided on the peripheral edge of compression ring 304 to improve the sealing function thereof. Sealing body 360 can be provided of particularly suitable material to perform the sealing function desired, including resistance to the fluids to which it will come in contact. Further, it should be understood that various fluid stops, fluid guide channels and the like can be provided between compression ring 304 and umbrella or skirt 316 to direct moisture away from fastener clip assembly 300, to inhibit the flow of moisture, and the like.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A push-in fastener clip assembly, comprising:
   a fastener having a plurality of resiliently deflectable legs defining through slots between pairs of said resiliently deflectable legs;
   a compression ring having a body encircling said plurality of resiliently deflectable legs and an aperture therein of a size and shape for engaging and deflecting said resiliently deflectable legs upon relative axial movement between said resiliently deflectable legs and said compression ring; and
   at least one frangible connection between said fastener and said body of said compression ring
   said at least one frangible connection extending into at least one of said through slots.

2. The push-in fastener clip assembly of claim 1, including a plurality of frangible connections between said fastener and said body of said compression ring, each said frangible connection extending into one of said through slots
   said frangible connections configured to fracture with segments thereof remaining on said body and extending into said through slots.

3. The push-in fastener clip assembly of claim 2, said compression ring being a substantially flat, annular body.

4. The push-in fastener clip assembly of claim 2, said compression ring being a concave body and defining a seal at a peripheral edge thereof.

5. The push-in fastener clip assembly of claim 4, including an overmolded sealing body on said compression ring.

6. The push-in fastener clip assembly of claim 2, including four said resiliently deflectable legs and four frangible connections between said fastener and said body of said compression ring.

7. The push-in fastener clip assembly of claim 1, having a plurality of frangible connections between said fastener and said compression ring; and at least some frangible connections of said plurality of frangible connections configured to rupture with portions thereof remaining on said compression ring, with said portions extending into said through slots.

8. The push-in fastener clip assembly of claim 7, including four said through slots and four said frangible connections.

9. The push-in fastener dip assembly of claim 8, said compression ring being a substantially flat, annular body.

10. The push-in fastener clip assembly of claim 8, said compression ring being a concave body defining a seal at a peripheral edge thereof.

11. The push-in fastener clip assembly of claim 10, including an overmolded sealing body on said compression ring.

12. A push-in fastener clip assembly, comprising:
a fastener having a head and a plurality of resiliently deflectable legs connected to said head, said plurality of resiliently deflectable legs being joined at distal ends thereof in a tapered distal tip;
axial slots defined between adjacent resiliently deflectable legs of said plurality of resiliently deflectable legs;
a compression ring having a body encircling said plurality of resiliently deflectable legs and having an aperture therein of size and shape for engaging and deflecting said resiliently deflectable legs upon relative axial movement between said resiliently deflectable legs and said compression ring; and
a plurality of frangible connections between said fastener and said compression ring body, each said frangible connection configured to rupture upon relative axial movement between said fastener and said compression ring with segments thereof remaining on said body and extending into said through slots.

13. The push-in, fastener clip assembly of claim 12, said resiliently deflectable legs having proximal portions relative to said head that are substantially axially oriented and distal portions that are inwardly angled.

14. The push-in fastener clip assembly of claim 12, said compression ring being a substantially flat, annular body.

15. The push-in fastener clip assembly of claim 12, said compression ring being a concave body defining a seal at a peripheral edge thereof.

16. The push-in fastener clip assembly of claim 15, including an overmolded sealing body on said compression ring.

17. A push-in fastener clip assembly, comprising:
a fastener having a head, a central post and a plurality of resiliently deflectable legs connected to said head, said plurality of resiliently deflectable legs being joined at distal ends thereof in a distal tip of said central post, said deflectable legs defining through slots between pairs of legs;
a compression ring encircling said plurality of resiliently deflectable legs and having an aperture therein of size and shape for engaging and deflecting said resiliently deflectable legs of said plurality of resiliently deflectable legs upon relative axial movement between said resiliently deflectable legs and said compression ring;
said compression ring having a pre-installation position and a post-installation position encircling said plurality of resiliently deflectable legs, said pre-installation position being nearer to said distal tip than said post-installation position is to said distal tip; and
a plurality of frangible connections between said fastener and compression ring when said compression ring is in said pre-installation position, each frangible connection of said plurality of frangible connections configured for rupturing upon relative movement between said fastener and said compression ring in said pre-installation position
said frangible connections configured to fracture with segments thereof remaining on said compression ring and extending into said through slots.

18. The push-in fastener clip assembly of claim 17, said compression. ring being a substantially flat, annular body.

19. The push-in fastener clip assembly of claim 17, said compression ring being a concave body defining a seal at a peripheral edge thereof.

20. The push-in fastener clip assembly of claim 19, including an overmolded sealing body on said compression ring.

* * * * *